(12) United States Patent
Gregory et al.

(10) Patent No.: US 7,026,900 B1
(45) Date of Patent: Apr. 11, 2006

(54) MAGNETIC MOTION DEVICE

(75) Inventors: John Gregory, 1112 The Spangler Rd., New Oxford, PA (US) 17350; James Kearns, York, PA (US)

(73) Assignee: John Gregory, New Oxford, PA (US)

( * ) Notice: Subject to any disclaimer, the term of this patent is extended or adjusted under 35 U.S.C. 154(b) by 0 days.

(21) Appl. No.: 11/232,669

(22) Filed: Sep. 22, 2005

(51) Int. Cl.
*H01F 7/08* (2006.01)

(52) U.S. Cl. .................. 335/220; 335/228; 335/276; 310/15; 310/20; 310/21; 310/36; 310/37

(58) Field of Classification Search ............ 310/1, 310/15, 20, 21, 22, 36, 37; 434/380; 335/220, 335/228, 229, 276, 296; 446/129, 134–136; 74/99 R–99 A
See application file for complete search history.

(56) References Cited

U.S. PATENT DOCUMENTS 3,214,854 A 11/1965 Swan

*Primary Examiner*—Ramon M. Barrera
(74) *Attorney, Agent, or Firm*—Galbreath Law Offices, P.C.; John A. Galbreath

(57) ABSTRACT

A magnetic motion device is disclosed, wherein a permanent magnet slides back and forth along a pivoting rail due to the interaction between the slide's magnetic field, the magnetic fields produced by a permanent/electromagnet combination at each end of the rail, and gravitational force. The ends of the rail thereby move up and down in a reciprocating, "see-saw" fashion. Power-take-off mechanisms can be connected in any suitable manner to the device, so that the motion of the rail can power an external device such as a pump.

20 Claims, 6 Drawing Sheets

MAGNETIC MOTION DEVICE

BACKGROUND

1. Field of the Invention

The invention is in the area of electromechanical devices, specifically a magnetic motion machine comprising a permanent magnet which slides back and forth along a pivoting rail due to the interaction between the slide's magnetic field, the magnetic fields produced by a permanent/electromagnet combination at each end of the rail, and gravitational force.

2. Description of the Related Art

U.S. Pat. No. 3,214,854 to Swan discloses an "animated" device wherein a rod with a permanent magnet at its end swings back and forth due to the permanent magnet's interaction with the magnetic field produced by a nearby electromagnet. However, Swan's device does not employ a permanent magnet slide that moves back and forth along a pivoting rail due to the interaction between the slide's magnetic field, the magnetic fields produced by a permanent/electromagnet combination at each end of the rail, and gravitational force.

SUMMARY OF THE INVENTION

The invention is a magnetic motion device, comprised of a permanent magnet which slides back and forth along a pivoting rail due to the interaction between the slide's magnetic field, the magnetic fields produced by a permanent/electromagnet combination at each end of the rail, and gravitational force.

Several objects and advantages of the invention are:

It is an object of the invention to provide an efficient means of converting external power, such as solar power, into physical motion that can drive a device including but not limited to a pump.

It is a further object of the invention to provide a magnetic motion device wherein the energy of a sliding member is preserved (except for frictional losses) as the sliding member moves back and forth along a rail.

It is a further object of the invention to provide a low-cost device that can be used in areas where conventional electric power is not available.

Further objects and advantages of the invention will become apparent from a consideration of the ensuing description and drawings.

DETAILED DESCRIPTION OF THE INVENTION

Figure 1:
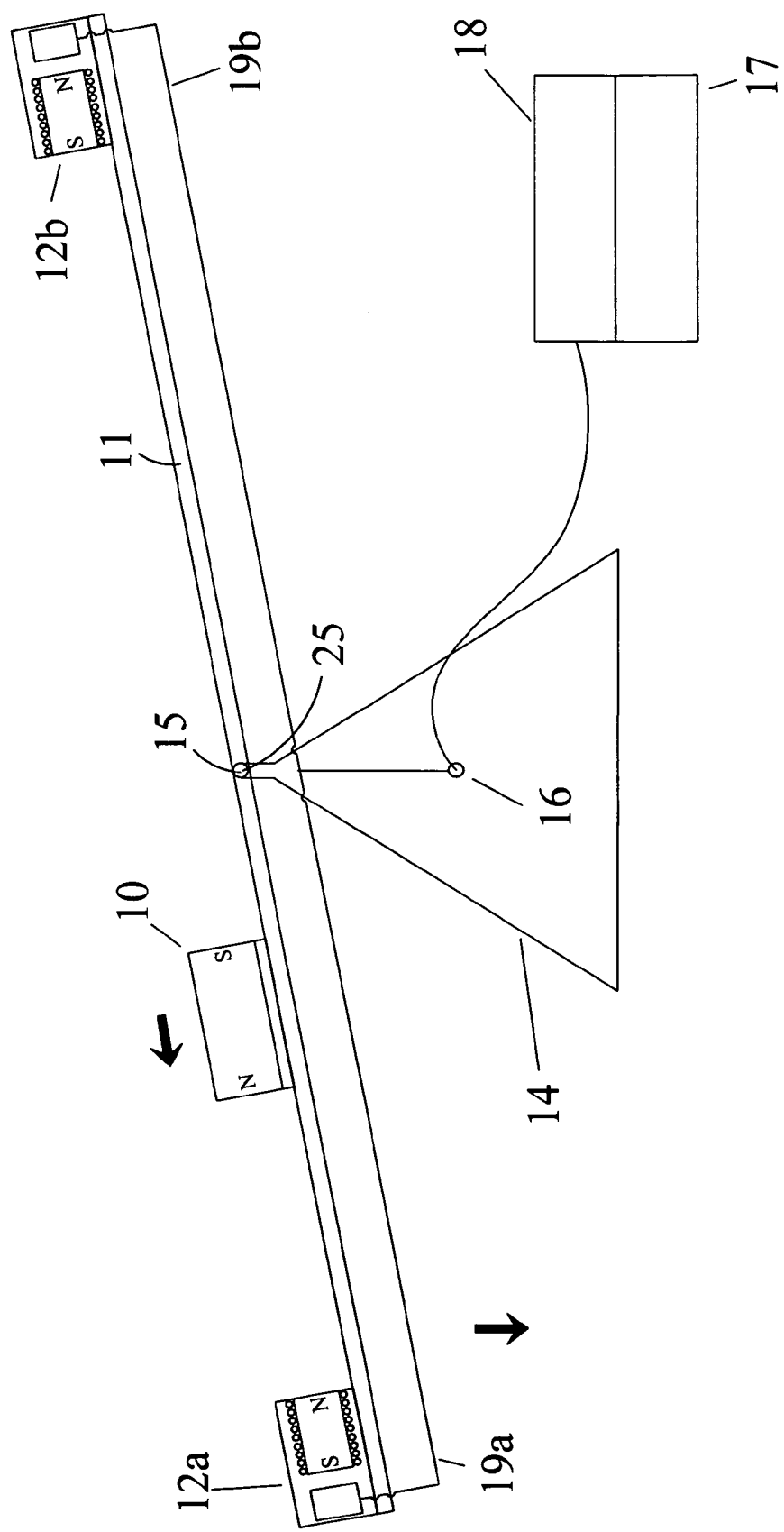
FIG. 1 is a side view of the device, illustrating its basic structure comprising a slide, a rail, and end housings at opposite ends of the rail. For greater clarity, the end housings are shown in cutaway view.

The following provides a list of the reference characters used in the drawings:

| | |
|---|---|
| 10. | Slide |
| 11. | Rail |
| 12a & b. | End housings |
| 13a & b. | Limit switches |
| 14. | Frame |
| 15. | Rotational bearing |
| 16. | Terminal connection |
| 17. | External power source |
| 18. | Signal processing circuitry |
| 19a & b. | Wires |
| 20. | Slide bearing |
| 21a & b. | End housing permanent magnets |
| 22a & b. | Windings |
| 23a & b. | End housing circuitry |
| 24a & b. | Limit switch wires |
| 25. | Power-take-off means |

As shown in FIG. 1, the device comprises a slide 10 that moves back and forth along a pivoting rail 11. End housings 12a&b are located at opposite ends of rail 11. Rail 11 rests on a frame 14, which supports rail 11 and allows rail 11 to pivot in a "see-saw" fashion about a rotational bearing 15 located at the top of frame 14. Rotational bearing 15 can be any suitable type known in the art, and is structured and positioned such that it does not block the movement of slide 10 along the upper surface of rail 11.

Frame 14 also has a terminal connection 16 to an external power source 17 and signal processing circuitry 18. External power source 17 can be any suitable means of supplying electrical power to the device, including but not limited to a battery charged by an external direct current source (e.g., a solar panel). Signal processing circuitry 18 may include any suitable pulse generator circuitry which is known in the art. Wires 19a&b run from terminal connection 16 to end housings 12a&b respectively, and carry current from external power source 17 and signals from signal processing circuitry 18.

Figure 2:
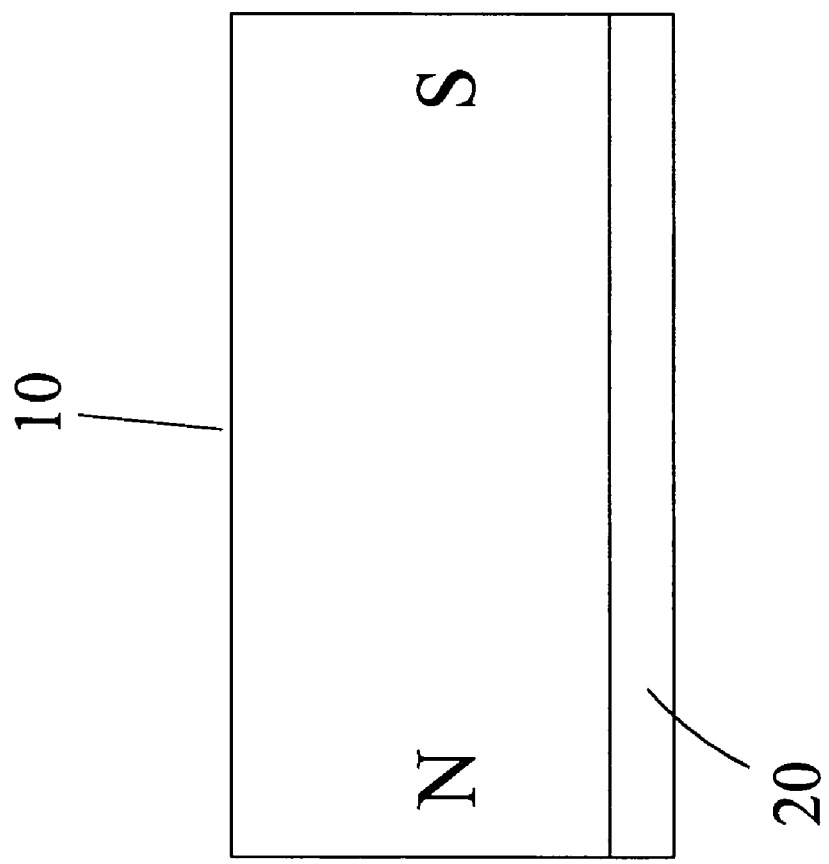
FIG. 2 is a side view of the slide in further detail.

As shown in FIG. 2, slide 10 is a permanent magnet with a north pole at one end and a south pole at the other end. The north pole of slide 10 is oriented such that it faces end housing 12a, and the south pole of slide 10 is oriented such that it faces end housing 12b. A slide bearing 20 is located on the rail-proximate surface of slide 10, in order to reduce friction when slide 10 travels along rail 11. Slide bearing 20 may be any suitable type known in the art. Any conventionally-known means can be used to secure slide 10 to rail 11 in a way that prevents slide 10 from falling off the sides of rail 11, without impeding slide 10's travel along the longitudinal dimension of rail 11.

Figure 3:
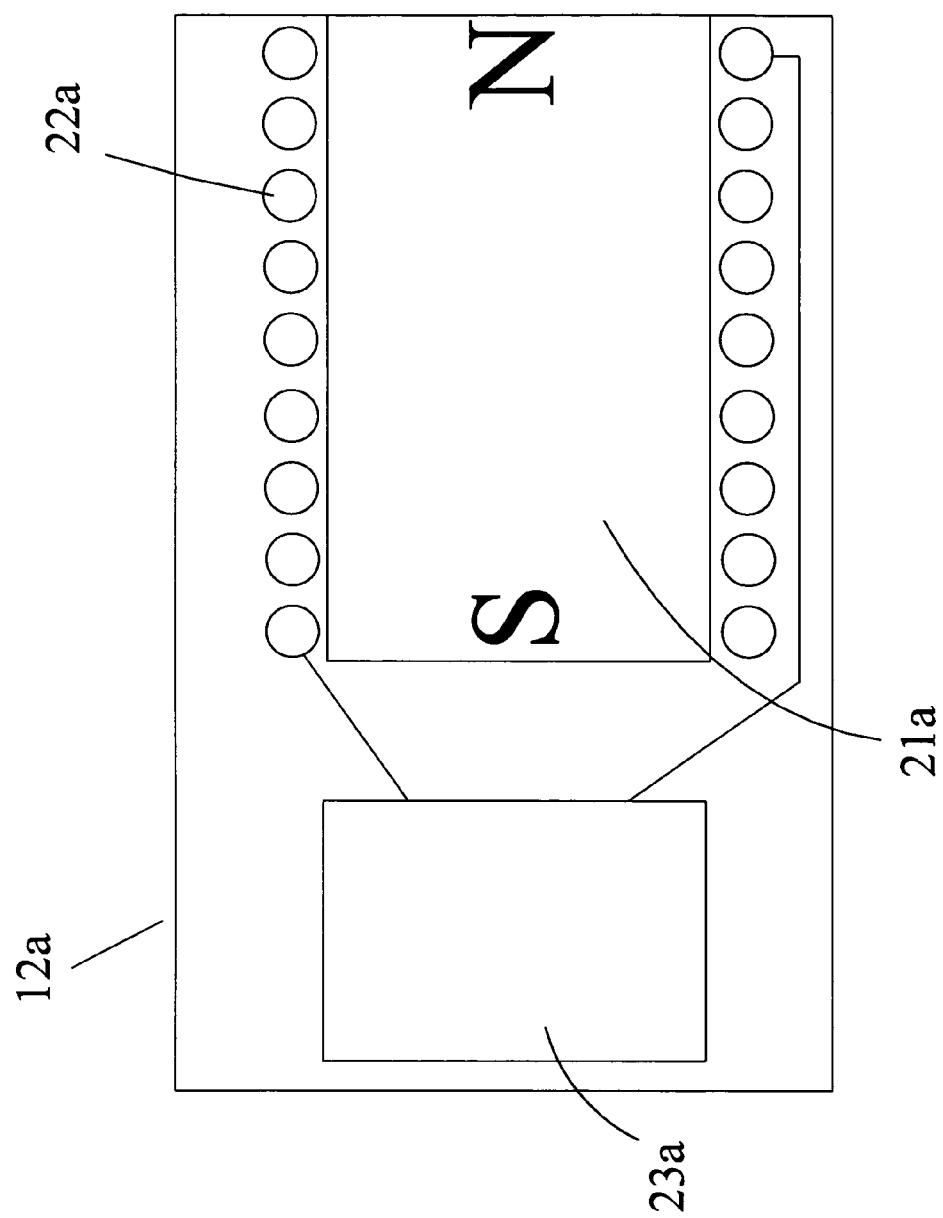
FIG. 3 is a cutaway side view of one of the end housings in further detail.

As shown in FIG. 3, end housing 12a contains an end housing permanent magnet 21a having a north pole at its end that faces slide 10 and a south pole at its other end. Winding 22a, comprised of coiled wire, is wound around end housing permanent magnet 21a such that when current is applied to winding 22a via external power source 17, end housing permanent magnet 21a also becomes an electromagnet. End housing 12a also contains end housing circuitry 23a. End housing circuitry 23a connects between wire 19a and winding 22a, and along with signal processing circuitry 18, controls the timing and flow of current to winding 22a. The pulse generator circuitry previously mentioned as located on signal processing circuitry 18 may alternatively be located on end housing circuitry 23*a*.

Figure 4:
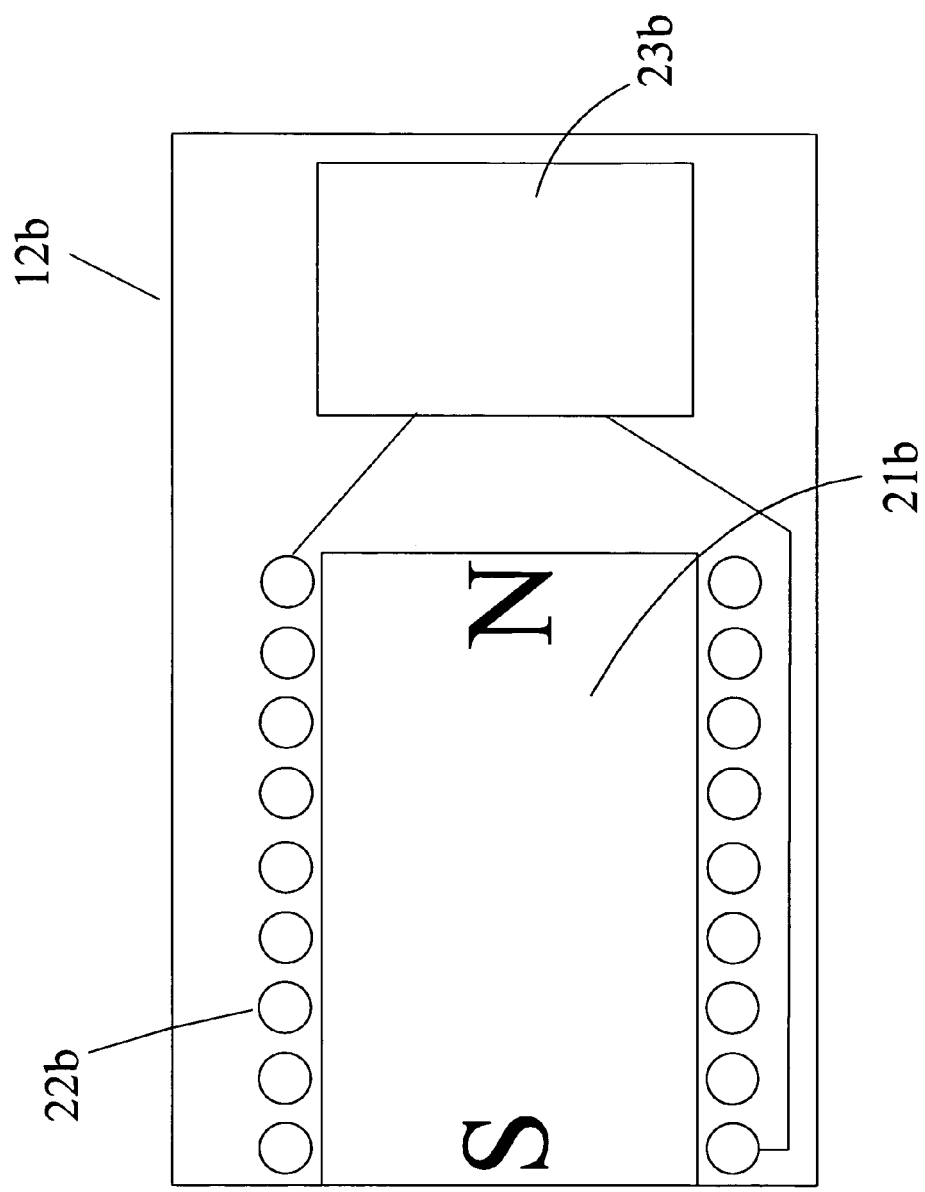
FIG. 4 is a cutaway side view of the other end housing in further detail.

FIG. 4 shows the opposite end housing 12*b*. End housing 12*b* is similar in most respects to end housing 12*a*, except that end housing permanent magnet 21*b* has a south pole at its end that faces slide 10 and a north pole at its other end.

In operation, slide 10 travels back and forth along rail 11, influenced by its magnetic field; the magnetic fields of end housing permanent magnets 21*a*&*b*; the magnetic fields generated when a current pulse is sent to windings 22*a*&*b* (this additional electromagnetic field offsets frictional losses and imparts an extra impulsive driving force to slide 10); and the force of gravity.

As slide 10 travels back and forth along rail 11, rail 11 pivots about rotational bearing 15. The ends of rail 11 thereby move up and down in a reciprocating, "see-saw" fashion. Power-take-off means 25 are connected in any conventionally known manner to the invention, so that the motion of rail 11 can power an external device including, but not limited to, a pump. By way of non-limiting example, these power-take-off means can include a shaft connected to rail 11 in the area of rotational bearing 15, such that said shaft reciprocatingly rotates just as rail 11 does.

The travel of slide 10 and the forces influencing it are further explained below:

As seen in FIG. 1, when slide 10 is traveling down rail 11 toward end housing 12*a*, it is influenced of course by the force of gravity. The weight of slide 10 thus tips rail 111 such that the end of rail 11 on which end housing 12*a* is located moves toward the ground. At some point in the motion of slide 10 toward end housing 12*a*, slide 10 reaches its maximum velocity and maximum kinetic energy, and thus its relative potential energy is at a minimum. From that point of maximum kinetic energy, slide 10 begins to slow down—i.e., it loses kinetic energy due to the repulsive force of end housing permanent magnet 21*a*. The kinetic energy goes into frictional losses, or into the energy of the magnetic field that surrounds slide 10 and end housing permanent magnet 21*a* as slide 10 approaches end housing permanent magnet 21*a*. In other words, potential energy is increasingly stored in the magnetic field that surrounds slide 10 and end housing permanent magnet 21*a*.

It can be appreciated that at each end of rail 11, there is an equilibrium point close to the end housing, where slide 10 would naturally "sit" as its weight was just counterbalanced by the repulsive force of its permanent magnet and the end housing permanent magnet. In operation, slide 10 will go somewhat past this equilibrium point before stopping, because it has some velocity and therefore inertia.

When slide 10 stops, its kinetic energy at this point is zero, and the potential energy in the magnetic field that surrounds slide 10 and end housing permanent magnet 21*a* comes to a maximum. Put another way, at this point the repulsive force between the north pole of slide 10's permanent magnet and the north pole of end housing permanent magnet 21*a* is greater than the gravitational force acting on slide 10. The magnetic field that surrounds slide 10 and end housing permanent magnet 21*a* gives up its energy to slide 10, which reverses direction and begins to travel back up toward the pivot point of rail 11.

Thus it can be seen that the permanent magnets in the slide and the end housing permanent magnet act together as a magnetic spring mechanism to store/conserve the energy of the moving slide, which is then used to propel the slide back up the rail.

Figure 5:
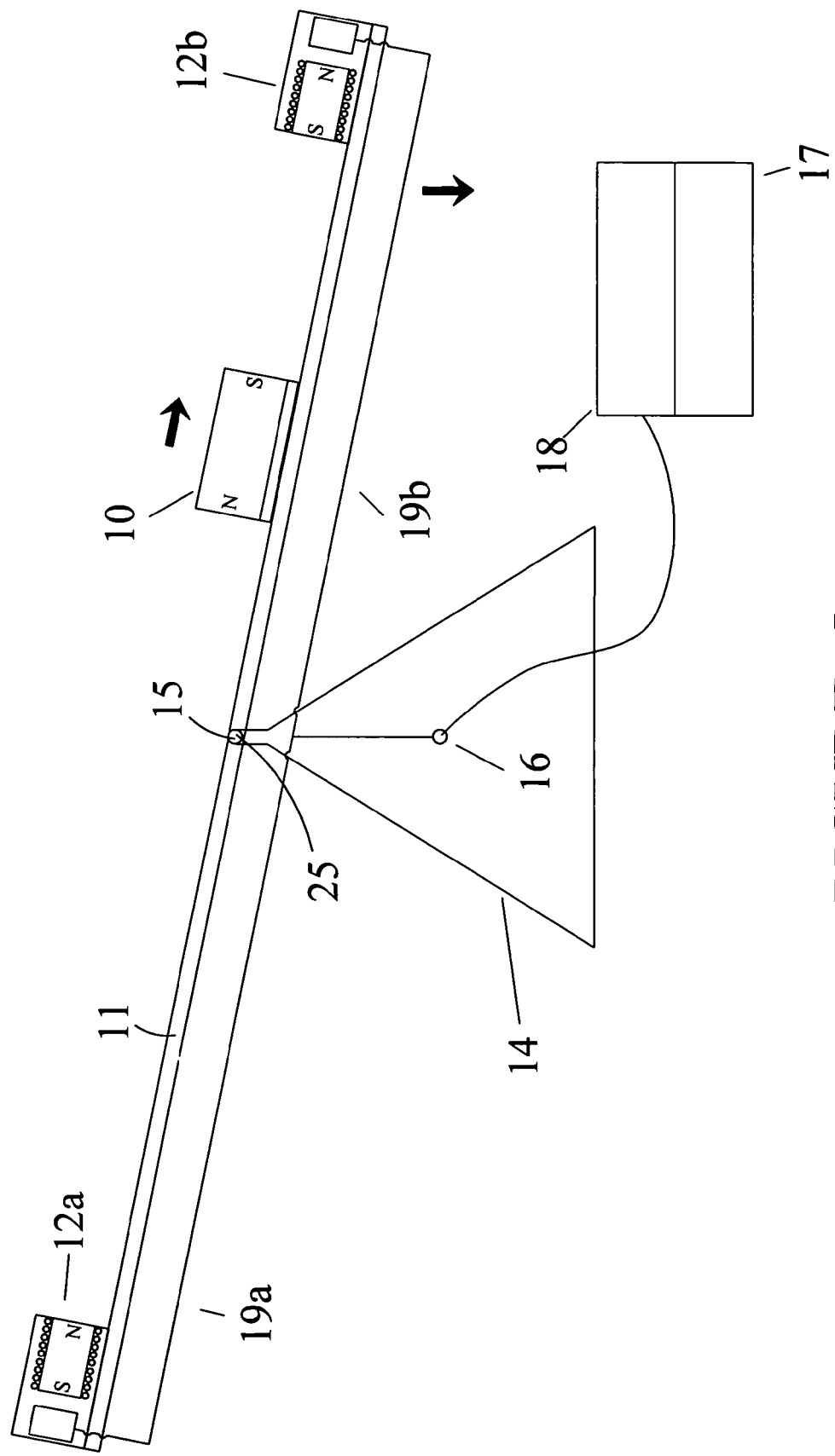
FIG. 5 is similar to FIG. 1, except that the slide is approaching the opposite end of the rail from FIG. 1.

Until slide 10 passes the pivot point on rail 11, the gravitational force acting on slide 10 opposes the kinetic energy which has been imparted to it. However, as shown in FIG. 5, once slide 10 passes the pivot point, rail 11 begins to tip the other way and gravitational force adds to the kinetic energy of slide 10 and its velocity toward the opposite end housing 12*b*. As slide 10 approaches end housing 12*b*, the process repeats itself—except that the repulsive force is now between the south pole of slide 10 and the south pole of end housing permanent magnet 21*b*.

Without the additional electromagnetic power provided by windings 22*a*&*b*, slide 10 would go back and forth until the initial velocity and energy provided to slide 10 was exhausted by frictional losses. The additional electromagnetic power of a current passing through windings 22*a*&*b* serves to offset these losses, and is provided in the following manner (the approach of slide 10 toward end housing 12*a* is used to illustrate):

Just beyond the aforementioned equilibrium point, when slide 10 stops, the induced current in winding 22*a* will go to zero. When this occurs, an active pulse is sent through winding 22*a* by the pulse generating circuitry on end housing circuitry 23*a* and/or signal processing circuitry 18. This pulse adds to the energy of the magnetic field surrounding slide 10 and end housing permanent magnet 21*a*, and imparts an extra impulsive driving force to slide 10 that helps propel slide 10 back toward the pivot point of rail 11. Thus it can be seen that windings 22*a*&*b* serve a dual purpose—that of an inductive sensor to determine when the slide velocity goes to zero, and that of an electromagnet to add impulsive energy to the slide to offset losses due to friction, drag, etc. Windings 22*a*&*b* should be designed, of course, to minimize inductive losses due to induced currents.

Figure 6:
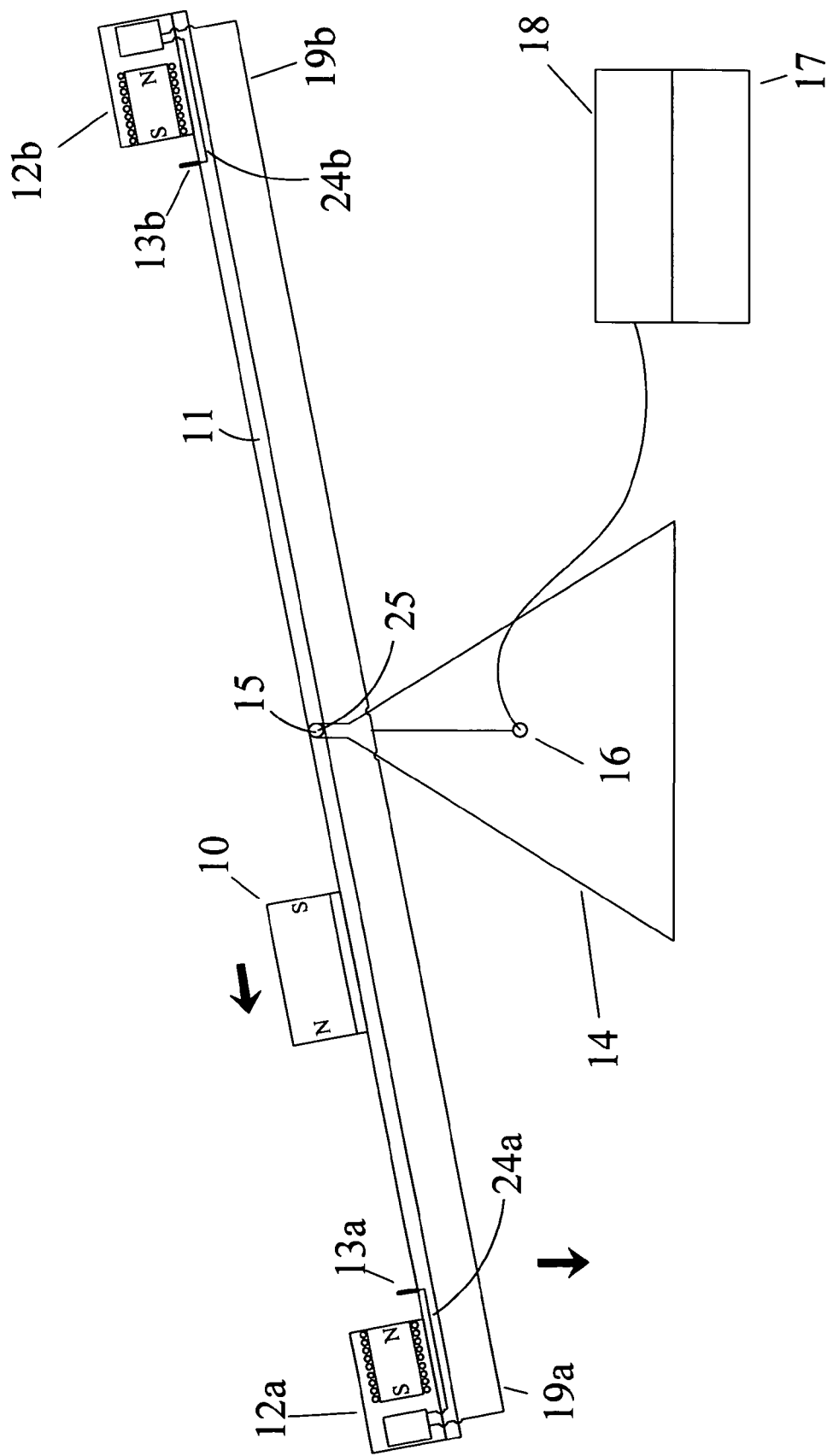
FIG. 6 shows an alternative embodiment that employs limit switches to sense when the slide is approaching the end housings.

FIG. 6 shows an alternative embodiment wherein limit switches 13*a*&*b* are located on rail 11 proximate to end housings 12*a*&*b*. Limit switches 13*a*&*b* are used as an alternate, physical means of detecting when slide 10 is closely approaching end housings 12*a*&*b*, and are connected to end housing circuitry 23*a*&*b* via limit switch wires 24*a*&*b* respectively. Limit switches 13*a*&*b* can be any suitable type known in the art, and are configured such that they are "tripped" by linear slide 10 as it travels back and forth along rail 11. Limit switch wires 24*a*&*b* ensure that the tripped or non-tripped condition of limit switches 13*a*&*b* is known to end housing circuitry 23*a*&*b* and/or signal processing circuitry 18.

In this alternative embodiment (the approach of slide 10 toward end housing 12*a* is again used to illustrate), when end housing circuitry 23*a* and/or signal processing circuitry 18 senses that slide 10 has tripped limit switch 13*a* and is therefore close to zero velocity, the pulse generating circuitry on end housing circuitry 23*a* and/or signal processing circuitry 18 sends an active pulse through winding 22*a* to boost the repulsive energy imparted to slide 10.

While the above descriptions contain many specificities, these shall not be construed as limitations on the scope of the invention, but rather as exemplifications of embodiments thereof.

Many other variations are possible without departing from the spirit of the invention. Examples of just a few of the possible variations follow:

The length of the rail can be different.

The degree of rail oscillation ("see-saw" up and down movement) can vary, depending on the mass of the slide and the strength of the various permanent magnets and electromagnets contained in the device.

The pivot point, where the rotational bearing is located, does not have to be at the longitudinal center of the rail.

The shape of the slide can vary, vs. the elongated shape of the main embodiment.

The mass of the slide can vary, as can the strength of its permanent magnet. The strength of the end housing permanent magnets and the extra pulse generated by the electromagnets can vary as well. However, all these parameters must be coordinated such that the slide is able to move back and forth continuously along the rail.

The slide can also be an electromagnet.

The shape of the end housing permanent magnets can vary, vs. the elongated round bar of the main embodiment.

The slide bearing can be eliminated, and alternate friction-reducing means used, including but not limited to bearings located on the slide-contacting surface of the rail.

Accordingly, the scope of the invention should be determined not by the embodiments illustrated, but by the appended claims and their legal equivalents.

What is claimed is:

1. A magnetic motion device, comprising:
   (a) a traveling magnet having first and second traveling magnet ends, one pole of said traveling magnet being located at said first traveling magnet end and an opposite pole being located at said second traveling magnet end;
   (b) a rail on which said traveling magnet travels, said rail having first and second rail ends with a first end magnet located at said first rail end and a second end magnet located at said second rail end, said first and second end magnets each having a pole at their traveling-magnet-proximate portion which repels said traveling magnet;
   (c) a pivot point located at a predetermined position between said first and second rail ends, such that said rail is rotatable about said pivot point;
   whereby said traveling magnet travels back and forth between said first and second end magnets, thereby causing said rail to rotate in a reciprocal fashion about said pivot point.

2. The magnetic motion device of claim 1, wherein said device also includes at least one electromagnet located at one of said rail ends.

3. The magnetic motion device of claim 2, wherein said device includes two electromagnets, the first said electromagnet located at said first rail end and the second said electromagnet located at said second rail end.

4. The magnetic motion device of claim 3, wherein said electromagnets are comprised of wire coils wound about said first and second end magnets and connected to an external power source.

5. The magnetic motion device of claim 4, wherein pulse generator circuitry is connected between said wire coils and said external power source, such that an electric pulse can be sent through said wire coils.

6. The magnetic motion device of claim 5, wherein said pulse generator circuitry includes inductive means for sensing when said traveling magnet is proximate to said electromagnets.

7. The magnetic motion device of claim 5, wherein at least one limit switch is located on said rail proximate to one of said end magnets and connected to said pulse generator circuitry.

8. The magnetic motion device of claim 4, wherein said external power source is a solar panel.

9. The magnetic motion device of claim 1, wherein said pivot point is located at the longitudinal center of said rail.

10. The magnetic motion device of claim 1, wherein said device includes a frame on which said pivot point rests.

11. The magnetic motion device of claim 1, wherein said device includes power-take-off means to transmit said reciprocating motion of said rail to an external device.

12. The magnetic motion device of claim 1, wherein said traveling magnet has friction-reducing means located on its rail-proximate surface.

13. A magnetic motion device, comprising:
   (a) a traveling magnet having first and second traveling magnet ends;
   (b) a rail on which said traveling magnet travels, said rail having first and second rail ends and means for repelling said traveling magnet as said traveling magnet approaches each rail end;
   (c) means for rotating said rail about a pivot point located between said first and second rail ends;
   whereby said traveling magnet travels back and forth between said repelling means, thereby causing said rail to rotate in a reciprocal fashion about said pivot point.

14. The magnetic motion device of claim 13, wherein said device includes two electromagnets, the first said electromagnet located at said first rail end and the second said electromagnet located at said second rail end.

15. The magnetic motion device of claim 14, wherein said electromagnets are comprised of wire coils wound about said repelling means and connected to an external power source.

16. The magnetic motion device of claim 15, wherein pulse generator circuitry is connected between said wire coils and said external power source, such that an electric pulse can be sent through said wire coils.

17. The magnetic motion device of claim 16, wherein said pulse generator circuitry includes inductive means for sensing when said traveling magnet is proximate to said electromagnets.

18. The magnetic motion device of claim 16, wherein at least one limit switch is located on said rail proximate to one of said end magnets and connected to said pulse generator circuitry.

19. The magnetic motion device of claim 13, wherein said device includes a frame on which said pivot point rests.

20. The magnetic motion device of claim 13, wherein said device includes power-take-off means to transmit said reciprocating motion of said rail to an external device.

* * * * *